UNITED STATES PATENT OFFICE.

HARRY P. BASSETT, OF CYNTHIANA, KENTUCKY.

PROCESS OF TREATING WASTE DENITRATION LIQUORS.

1,390,329.

Specification of Letters Patent.   Patented Sept. 13, 1921.

No Drawing.   Application filed June 18, 1920.   Serial No. 390,016.

*To all whom it may concern:*

Be it known that I, HARRY P. BASSETT, a citizen of the United States, residing at Cynthiana, in the county of Harrison and State of Kentucky, have invented certain new and useful Improvements in Processes of Treating Waste Denitration Liquors, of which the following is a specification.

This invention relates to the treatment of waste denitrating liquors occurring in the manufacture of artificial silk by the nitrocellulose process, and has for its object to recover valuable constituents therefrom.

These waste liquors contain various substances of value, such as sodium nitrate, sodium sulfid, sodium polysulfid, sodium hydrogen sulfid, and other sufids and sulfates, ammonium salts, etc., but so far as I am aware, there is no practical process for the satisfactory recovery of sulfur or other values from these liquors.

Now, I have discovered that the greater part of the sulfur present in liquors of this character can be readily and conveniently recovered and utilized in making sodium hydrogen sulfid employed in denitration, thereby effecting a substantial economy therein, and that other values also can be advantageously recovered.

In the practice of my process, I treat the waste liquor which is substantially neutral or slightly alkaline, with a zinc compound, such for example, as zinc chlorid, zinc carbonate, zinc sulfate, or zinc oxid, but preferably zinc hydroxid, whereby zinc sulfid is formed. The amount of the zinc compound used will depend upon the amount of sulfur present in the liquor to be recovered, sufficient of the zinc compound being used to precipitate all or substantially all of the sulfur present in the normal sulfid salts in the waste liquor.

The zinc sulfid thus produced is separated from the liquor, preferably by filtration, washed with water until free or substantially free from constituents of such liquor and subjected to the action of an acid or acid salt, preferably sulfuric acid or niter cake, to produce hydrogen sulfid, which is caused to be absorbed in a solution of sodium sulfid in any well known manner, as by the treatment of the hydrogen sulfid gas with the sodium sulfid solution in an absorption tower. The resulting sodium hydrogen sulfid is employed in the denitration process.

The liquor remaining after the removal of the zinc sulfid contains sodium nitrite, ammonia or ammonium salts, and the other remaining salts. If some other zinc salt than the hydroxid is used, this liquor is rendered alkaline by being treated with an excess of sodium hydroxid and heated, the ammonia given off being collected, if desired. If, however, zinc hydroxid is used, the liquor is thereby rendered alkaline by the addition of the zinc hydroxid and the treatment with sodium hydroxid is not necessary. In such case, the liquor remaining after the separation of the zinc sulfid may be heated without further treatment to drive off the ammonia, the ammonium salts present in the waste liquor being converted into ammonium hydroxid by the action of the zinc hydroxid as will be understood.

It is essential to the practice of the process that the liquor shall be substantially neutral or preferably alkaline to prevent the formation of sulfur and nitrogen compounds which would interfere with the successful practice of the process.

The remaining liquor is then evaporated and cooled, whereby a crop of crystals of sodium nitrite is obtained. These crystals are produced when the solution is evaporated to about 37° Bé., and then cooled. The sodium nitrite crystals are removed and the mother liquor heated with a zinc salt, preferably zinc sulfate, in slightly less than molecular proportions with respect to the sodium hydroxid present in the mother liquor. As a result of this treatment, zinc hydroxid is formed as a gelatinous mass which is removed by filtration. The mother liquor containing sodium sulfate, sodium polysulfid, and any sodium nitrite and sodium hydroxid left in the liquor is then treated with an acid or acid salt, preferably sulfuric acid or niter cake until it is rendered substantially neutral. This treatment causes the precipitation of sulfur which is filtered and recovered in substantially a pure form. The remaining liquor containing sodium sulfate and sodium nitrite is evaporated to separate successive crops of crystals of sodium sulfate in the hot mother liquor and crystals of sodium nitrite in the liquor when cooled and these values are thus recovered.

The recovered sodium sulfate may be advantageously employed in the production of sodium sulfid, a solution of which is used in absorbing the hydrogen sulfid gas.

The zinc sulfate resulting from the treatment of the zinc sulfid with sulfuric acid or niter cake is treated with caustic soda or caustic mother liquor containing caustic soda thereby producing zinc hydroxid according to the following equation:

$$ZnSO_4 + 2NaOH = Zn(OH)_2 + Na_2SO_4.$$

An important advantage of my process results from the fact that the salts other than zinc sulfid produced by the reaction of the zinc salt are all freely soluble so that the zinc sulfid is readily recovered in a substantially pure form.

While the sodium sulfid employed in my process may be produced as described, it also may advantageously be produced by known methods from niter cake, which is a by-product of the artificial silk industry.

While I have described in detail the preferred practice of my process, it is to be understood that the details of procedure may be widely varied, that the order of the steps may be changed, and that known chemical equivalents of the materials used may be employed without departure from the spirit of my invention or the scope of the subjoined claims.

I claim:

1. The process of recovering values from denitration liquors resulting from denitrating artificial silk with sodium hydrogen sulfid, comprising treating the same with an alkaline zinc compound, and separating the precipitate formed.

2. The process of recovering values from denitration liquors resulting from denitrating artificial silk with sodium hydrogen sulfid, comprising treating the same with zinc hydroxid and separating the precipitate formed.

3. The process of recovering values from denitration liquors resulting from denitrating artificial silk with sodium hydrogen sulfid, comprising treating the same with an alkaline zinc compound, separating the precipitate formed and removing ammonia from the remaining liquor.

4. The process of recovering values from denitration liquors resulting from denitrating artificial silk with sodium hydrogen sulfid, comprising treating the same with an alkaline zinc compound, separating the precipitate formed, removing ammonia from the remaining liquor, evaporating the remaining liquor and cooling it whereby a crop of sodium nitrite crystals is produced and removing the crystals.

5. The process of recovering values from denitration liquors resulting from denitrating artificial silk with sodium hydrogen sulfid, comprising treating the same with a zinc compound, separating the precipitate formed, removing ammonia from the remaining liquor, evaporating the remaining liquor and cooling it whereby a crop of sodium nitrite crystals is produced, removing the crystals, adding a zinc salt to the mother liquor and separating the zinc hydroxid.

6. The process of recovering values from denitration liquors resulting from denitrating artificial silk with sodium hydrogen sulfid, comprising treating the same with an alkaline zinc compound, separating the precipitate formed, removing ammonia from the remaining liquor, evaporating the remaining liquor and cooling it whereby a crop of sodium nitrite crystals is produced, removing the crystals, adding zinc sulfate to the mother liquor and separating the zinc hydroxid.

7. The process of recovering values from denitration liquors resulting from denitrating artificial silk with sodium hydrogen sulfid, comprising treating the same with an alkaline zinc compound, separating the precipitate formed, removing ammonia from the remaining liquor, evaporating the remaining liquor and cooling it whereby a crop of sodium nitrite crystals is produced, removing the crystals, adding a zinc salt to the mother liquor, separating the zinc hydroxid, adding an acid to the remaining liquor until it is rendered substantially neutral and removing the sulfur precipitated.

8. The process of recovering values from denitration liquors resulting from denitrating artificial silk with sodium hydrogen sulfid, comprising treating the same with an alkaline zinc compound, separating the precipitate formed, removing ammonia from the remaining liquor, evaporating the remaining liquor and cooling it whereby a crop of sodium nitrite crystals is produced, removing the crystals, adding zinc sulfate to the mother liquor, separating the zinc hydroxid, and separating the remaining sodium sulfate and sodium nitrite by successive crystallizations.

9. The process of recovering values from denitration liquors resulting from denitrating artificial silk with sodium hydrogen sulfid, comprising treating the same with zinc hydroxid, separating the precipitate formed, and heating the remaining liquid to remove ammonia.

10. The process of recovering values from denitration liquors resulting from denitrating artificial silk with sodium hydrogen sulfid, comprising treating the same with zinc hydroxid, separating the precipitate formed, heating the remaining liquid to remove ammonia, evaporating the remaining liquid and cooling to remove a crop of sodium nitrite crystals and removing the crystals.

11. The process of recovering values from denitration liquors resulting from denitrating artificial silk with sodium hydrogen sulfid, comprising treating the same with zinc hydroxid, separating the precipitate formed, heating the remaining liquid to remove ammonia, evaporating the remaining liquid and cooling to remove a crop of sodium nitrite crystals, removing the crystals, adding a zinc salt to the mother liquor and separating the zinc hydroxid produced.

12. The process of recovering values from denitration liquors resulting from denitrating artificial silk with sodium hydrogen sulfid, comprising treating the same with zinc hydroxid, separating the precipitate formed, heating the remaining liquid to remove ammonia, evaporating the remaining liquid and cooling to remove a crop of sodium nitrite crystals, removing the crystals, adding zinc sulfate to the mother liquor and separating the zinc hydroxid produced.

13. The process of recovering values from denitration liquors resulting from denitrating artificial silk with sodium hydrogen sulfid, comprising treating the same with zinc hydroxid, separating the precipitate formed, heating the remaining liquid to remove ammonia, evaporating the remaining liquid and cooling to remove a crop of sodium nitrite crystals, removing the crystals, adding a zinc salt to the mother liquor, separating the zinc hydroxid produced, adding an acid to the remaining liquid until it is substantially neutral and removing the sulfur precipitated.

14. The process of recovering values from denitration liquors resulting from denitrating artificial silk with sodium hydrogen sulfid, comprising treating the same with zinc hydroxid, separating the precipitate formed, heating the remaining liquid to remove ammonia, evaporating the remaining liquid and cooling to remove a crop of sodium nitrite crystals, removing the crystals, adding a zinc salt to the mother liquor, separating the zinc hydroxid produced, adding sulfuric acid to the remaining liquid until it is substantially neutral and removing the sulfur precipitated.

15. The process of recovering values from denitration liquors resulting from denitrating artificial silk with sodium hydrogen sulfid, comprising treating the same with zinc hydroxid, separating the precipitate formed, heating the remaining liquid to remove ammonia, evaporating the remaining liquid and cooling to remove a crop of sodium nitrite crystals, removing the crystals, adding a zinc salt to the mother liquor, separating the zinc hydroxid produced, adding an acid to the remaining liquid until it is substantially neutral, removing the sulfur precipitated and separating the remaining sodium sulfate and sodium nitrite by successive crystallizations.

In testimony whereof I affix my signature in presence of two witnesses.

HARRY P. BASSETT.

Witnesses:
MARY F. LYONS,
F. M. O'HARA.